(12) United States Patent
Skari et al.

(10) Patent No.: US 11,704,615 B2
(45) Date of Patent: Jul. 18, 2023

(54) RISK ASSESSMENT APPARATUS AND RELATED METHODS

(71) Applicant: altumAI Inc., Chicago, IL (US)

(72) Inventors: Lars Evensen Skari, Rancho Palos Verdes, CA (US); Simon Prowse, Chicago, IL (US); Douglas Turk, Pacific Palisades, CA (US)

(73) Assignee: altumAI Insurance Solutions, LLC, Walnut Creek, CA (US)

( * ) Notice: Subject to any disclaimer, the term of this patent is extended or adjusted under 35 U.S.C. 154(b) by 0 days.

(21) Appl. No.: 17/459,828

(22) Filed: Aug. 27, 2021

(65) Prior Publication Data

US 2022/0067603 A1     Mar. 3, 2022

Related U.S. Application Data

(60) Provisional application No. 63/072,382, filed on Aug. 31, 2020.

(51) Int. Cl.
| | |
|---|---|
| *G06Q 10/0635* | (2023.01) |
| *G06F 3/0482* | (2013.01) |
| *G06Q 10/0639* | (2023.01) |
| *G06V 40/20* | (2022.01) |

(52) U.S. Cl.
CPC ....... *G06Q 10/0635* (2013.01); *G06F 3/0482* (2013.01); *G06Q 10/06395* (2013.01); *G06V 40/20* (2022.01)

(58) Field of Classification Search
CPC ....... G06F 1/00–2130/00; G06Q 10/00–50/00; G06V 10/00–40/00

USPC ................................................ 705/7.11–7.42
See application file for complete search history.

(56) References Cited

U.S. PATENT DOCUMENTS

| | | | |
|---|---|---|---|
| 4,937,763 A | | 6/1990 | Mott |
| 5,402,521 A | * | 3/1995 | Niida ................. G05B 23/0254 702/183 |
| 5,764,509 A | | 6/1998 | Gross |
| 5,987,399 A | | 11/1999 | Wegerich |
| 6,892,163 B1 | | 5/2005 | Herzog |
| 7,373,283 B2 | | 5/2008 | Herzog |
| 9,305,317 B2 | | 4/2016 | Grokop |
| 9,360,323 B2 | | 6/2016 | Grokop |
| 9,833,197 B1 | * | 12/2017 | Elhaway ............. A61B 5/0022 |

(Continued)

FOREIGN PATENT DOCUMENTS

| | | |
|---|---|---|
| WO | 2015061712 | 4/2015 |
| WO | 2017180929 | 10/2017 |
| WO | 2019036642 | 2/2019 |

*Primary Examiner* — Alan S Miller
(74) *Attorney, Agent, or Firm* — Fitch, Even, Tabin & Flannery LLP

(57) ABSTRACT

In one aspect, a device agnostic system for providing a fully connected worker risk assessment is disclosed. The system includes an interface and data model for capturing and interpreting one or more variables associated with a worker's body motion and non-body motion related data. The system further includes a processor for aggregating, assessing, and interpreting the one or more input variables to perform a fully connected worker risk assessment based on not only the worker's movement, but also non-movement related data. The processor further provides an output based on the processed one or more input variables to provide a fully connected risk assessment and solutions relating to the same.

19 Claims, 15 Drawing Sheets

(56) References Cited

U.S. PATENT DOCUMENTS

| | | |
|---|---|---|
| 10,123,751 B2 | 11/2018 | Petterson |
| 10,517,785 B2 | 12/2019 | Petterson |
| 10,674,965 B2 * | 6/2020 | Elhawary .............. A61B 5/1118 |
| 11,328,239 B2 * | 5/2022 | Baek ...................... G16H 50/20 |
| 2007/0250286 A1 * | 10/2007 | Duncan .............. A63B 23/0244 |
| | | 702/139 |
| 2009/0135009 A1 * | 5/2009 | Little ..................... G06Q 40/08 |
| | | 705/4 |
| 2011/0133927 A1 * | 6/2011 | Humphrey ............ G08B 21/04 |
| | | 600/300 |
| 2013/0325544 A1 * | 12/2013 | Bonin ................ G06Q 10/0635 |
| | | 705/7.28 |
| 2015/0120336 A1 | 4/2015 | Grokop |
| 2015/0233718 A1 | 8/2015 | Grokop |
| 2017/0181910 A1 | 6/2017 | Petterson |
| 2017/0245806 A1 * | 8/2017 | Elhawary .............. A61B 5/1122 |
| 2017/0296129 A1 * | 10/2017 | Petterson ............. A61B 5/7278 |
| 2017/0374436 A1 * | 12/2017 | Awiszus .................. A62B 9/00 |
| 2018/0068242 A1 * | 3/2018 | Outram .................... H04W 4/02 |
| 2019/0066535 A1 | 2/2019 | Pifko |
| 2019/0073618 A1 * | 3/2019 | Kanukurthy ........... G08B 21/02 |
| 2019/0200936 A1 | 7/2019 | Petterson |
| 2020/0074383 A1 * | 3/2020 | Smith ........... G06Q 10/063114 |
| 2020/0327465 A1 * | 10/2020 | Baek ...................... G16H 50/20 |

* cited by examiner

| Teams 5 | Workers 45 | | | | |
|---|---|---|---|---|---|
| Team Name ⇵ | Team Supervisor | Location ⇵ | Risk Score ⇵ Goal | Actual Team ⇵ Score | Change ⇵ |
| Growing Team 1 10 Members | Thomás Sanchez | Northwest Fields | 675 | 590 | +26 ⊙ Expand ▸ |
| Growing Team 2 15 Members | Mike Komperda | South Fields | 675 | 601 | +110 ⊙ Expand ▸ |
| Harvesting Team 1 4 Members | Clarke Gillebert | West Fields | 575 | 651 | -30 ⊙ Expand ▸ |
| Packing Team 1 8 Members | Jennifer Reid | Central Warehouse | 590 | 576 | +56 ⊙ Expand ▸ |
| Packing Team 2 8 Members | Kari Granieese | Central Warehouse | 590 | 599 | +10 ⊙ Expand ▸ |

FIG. 13 (Continued)

RISK ASSESSMENT APPARATUS AND RELATED METHODS

CROSS-REFERENCE TO RELATED APPLICATIONS

This application claims the benefit of U.S. Provisional Application No. 63/072,382, filed Aug. 31, 2020, which is incorporated herein by reference in its entirety.

FIELD

This disclosure relates to assessing worker injury risk and, in particular, to a fully connected worker risk assessment apparatus and methods relating to same.

BACKGROUND

Injuries in the workplace are common, especially in jobs that require manual labor. Many companies offer worker's compensation benefits to their employees when these injuries occur. Companies often only focus on reducing and treating injuries after they occur. With the increase in healthcare costs, there is an increased need to prevent and reduce workplace injuries.

Elements in the figures are illustrated for simplicity and clarity and have not necessarily been drawn to scale or to include all features, options or attachments. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
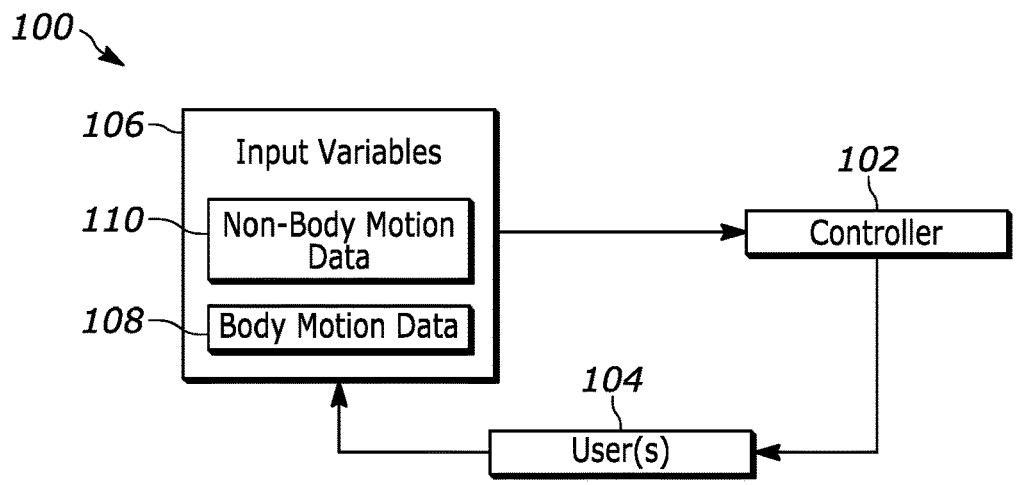
FIG. 1 is a schematic diagram of a fully connected risk assessment system of the present disclosure.

With reference to FIG. 1, an exemplary embodiment of a fully connected risk assessment system 100 is shown. The fully connected risk assessment system 100 includes a controller 102, a user 104, and input variables 106. In one form, the controller 102 includes a processor for processing the data received from the input variables 106. Processing the input variable 106 data may include aggregating, assessing, and interpreting the data. The controller 102, by processing the input variable 106 data is able to perform a fully connected worker risk assessment using both motion data 108 and non-motion data 110 for a holistic assessment of the risk associated with an activity. The controller 102 may provide its risk assessment determination to the user 104 so that the user 104 may take action to improve the working conditions to prevent or reduce the risk of injury. For example, where the non-body motion data 110 indicates a worker is working outside in a very hot temperature, the controller 102 may indicate that the worker should increase their water intake and take more breaks. Thus, employers may have employees use the fully connected risk assessment system 100 to monitor and/or reduce the employee's risk of injury. The risk assessment system 100 and the associated risk assessment determination may also or alternatively be used by service providers, such as insurance companies, when determining the risk of injury associated with performing various tasks. This information may be used to adjust the rates of insurance plans offered to the employer and/or employees.

The input variables 106 include body motion data 108 and non-body motion data 110. The body motion data 108 may include motion of a worker while performing an activity. In one embodiment, the body motion data 108 is extracted from motion data collected using a motion sensing device affixed to the user. In one example, the motion sensing device includes an inertial measurement unit (IMU) such as an accelerometer, gyroscope, and/or magnetometer. The body motion data 108 may be extracted from the raw sensor data using one or more algorithms to process the data. As one example, the system 100 may compare the sensor data with motion data models categorized as representative of certain motions. In another embodiment, the body motion data 108 is extracted from a series of image frames collected by a camera where the image frames include the worker performing an activity.

The body motion data 108 may include data relating to bending motions, twisting behavior, walking, running, slips, trips, falls, squatting, jumping and/or heavy lifting of a worker. The bending motions include forward, backward, and/or sideways bends. The body motion data 108 may include a count of how many of each motion were performed by a worker. For example, the body motion data 108 may include a count of how many bends the user performed in a day and the duration of each bend. The number of squats and the duration of each squat may similarly be included in the motion data 108. The twisting behavior may include the type of twisting motion of the worker along with the number of twists and/or the duration of the twisting behavior. The walking and/or running data may include the number of steps taken and/or the time the worker spent walking and/or running. The body motion data 108 may also include data indicating whether certain motions are repetitive and the frequency with which the motion is repeated. The body motion data 108 may also include data relating to how still or motionless the worker is and an associated length of time. The motion data may also include the smoothness of the workers motions, for example, whether the worker's motions are slow and controlled or the worker's motions are quick and sudden. The motion data may also include data indicative of the physical exertion of a worker, such as heart rate and blood pressure as examples.

The non-body motion data 110 may include worker specific data, employer specific data, environment data, temporal data, yield or throughput data, and/or commodity data as examples. The non-body motion data may be input by a user, such as user 104, into a user device and stored in memory of the system 100. The worker specific data may include biometric information of one or more workers. This may include the worker's age, sex, height, weight, prior medical history, body temperature, industry, company role/position, years of experience in the role, and/or symptoms. Symptoms may include the body temperature, blood pressure, heart rate, metabolic rate, a cough, shortness of breath, headache, fever, chills, muscle pain, a sore throat, loss of a sense of taste or smell, nausea, and/or vomiting. A worker may be prompted to enter this information at the beginning of a work shift. The employer specific data may include information regarding the health & safety environment of the workplace, such as an assessment of slip/trip/fall hazards, heat illness prevention preparedness or the maturity of the employer's safety plan and processes.

The environment data may include data regarding the work environment such as the temperature, the humidity, the heat index, the quality of the air (such as biological, non-biological, and/or chemical particles and pollutants in the air), the amount of ultraviolet radiation exposure, the amount of noise exposure, and/or the work location. The work location data may include, as examples, the coordinates, city, and/or whether the worker is working indoors, outdoors, or a combination. The temporal data may include the time of the worker's shift, the length of the worker's shift, the time since the beginning of the worker's shift, the worker's work schedule, the time of day/week/month/year, calendar time, and/or current season.

The yield or throughput data may include information relating to the worker's workload and/or the type of work the worker is performing such as whether the work is piece rate or hourly rate (e.g., rate of work required to complete work assigned), for example. The yield or throughput data may also include the capacity of the production line the worker is working on. The commodity data may include information pertaining to the type of product the worker is handling. For example, if the worker is a harvester, this information may include type of product is being harvested and how the product is harvested. The commodity data may also include the maximum weight, the minimum weight, the maximum volume, and/or the minimum volume the employee handles or carries at any given time.

Figure 2:
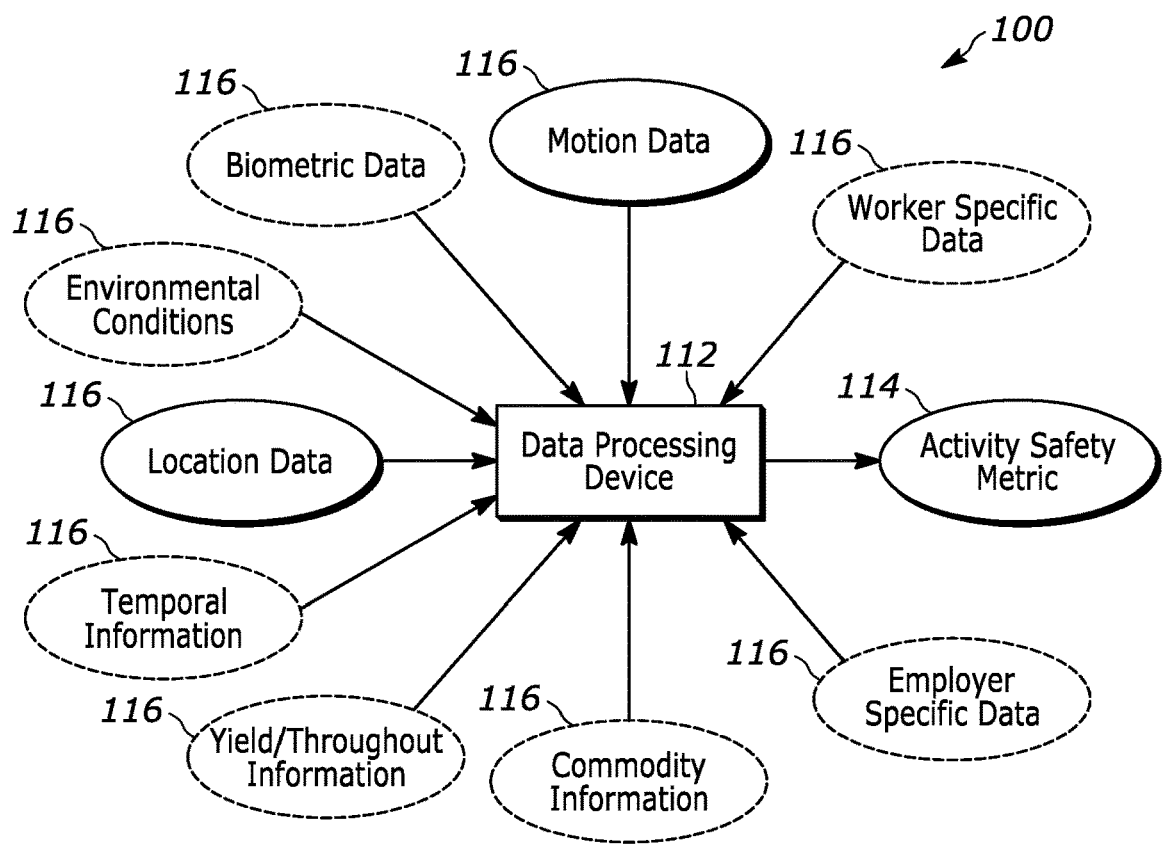
FIG. 2 is a schematic diagram of various example inputs a data processing device of the system of FIG. 1 may use in assessing risk.
Figure 4:
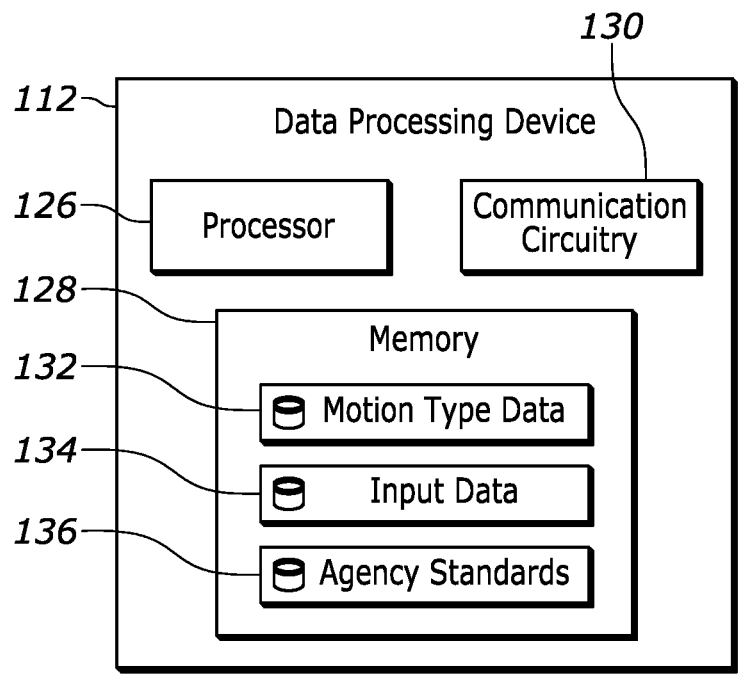
FIG. 4 is a block diagram of the data processing device of FIG. 2.

With reference to the embodiment shown in FIG. 2, the controller 102 is a data processing device 112 which generates one or more metrics 114 indicative of the risk or safety of the activity associated with the processed data. With reference to FIG. 4, the data processing device 112 includes a processor 126, memory 128, and communication circuitry 130. The memory 128 is in communication with the processor 126. In one embodiment, the memory 128 is in direct communication with the processor 126. In other embodiments, the memory 128 is remote from the processor 126 and communicates with the processor via a network. The memory 128 may be comprised of multiple units of memory stored at different locations. As an example, the memory 128 may include the memory of one or more remote server computers in communication with the processor 126. In another example, the memory 128 also includes memory local to the processor 126.

The memory 128 may include a plurality of databases and stored data. As shown in the embodiment of FIG. 4, the memory 128 stores motion type data 132, input data 134, and agency standards 136. The motion type data 132 may include a data models that have been categorized as representing certain motion types. The motion type data 132 may include data categorized as representing shallow bends, deep bends, shallow twists, deep twists, walking, running, fall, and/or slips as examples. The motion type data 132 may more specifically include data models representing specific types of motion, for example, forward sagittal flexion motions and other movements of a worker. In some forms, the motion data may include without limitation: bending (forward, backward, sideways) and twisting behavior (count, duration), walking (steps, duration), running (steps, duration), stillness, smoothness, repetitive motion, slips, trips, falls, squatting, jumping, heavy lifting and/or physical exertion. The data models of the motion type data 132 may be different for each job category (e.g., harvesting, construction, landscaping, etc.) and/or for each individual worker.

The input data 134 may include data collected, generated, and/or received by the data processing device 112. The input data 134 may include any data associated with the input variables 106 including motion data 108 and non-motion data 110. The input data 134 may include the data received from one or more of the work condition inputs 116 described in more detail below. The agency standards data 136 may include data and information received from an agency or database relating to interpreting the input data 134. The agency standards 136 may include statistics or information regarding various working conditions that are known to increase the risk of injury or compromise a worker's safety. As one example, the agency standards data 136 may include information relating to how long a worker can safely work in 100-degree Fahrenheit weather without overheating or suffering from heat exhaustion. The agency standards data 136 is described in more detail in regard to FIG. 3 below.

The communication circuitry 130 of the data processing device 112 is in communication with the processor 126. The processor 126 may communicate with remote devices via the communication circuitry 130. The processor 126 may communicate with a data collection device 122 via the communication circuitry 130 to receive motion or environmental data input. Where memory 128 or a portion thereof is remote from the processor 126, the processor 126 may communicate with the memory 128 via the communication circuitry. The processor 126 may also communicate with additional databases containing data, data models, or work condition standards information, such as agency standards 136, to use in analyzing the input data received. The communication circuitry 130 may be configured to communicate via a network 124, such as the internet and/or a cellular network. The communication circuitry 130 may also be configured to communicate via a direct communication, such as Bluetooth, Bluetooth Low Energy, Zigbee, Z-wave or the like. In one embodiment, the communication circuitry 130 communicates with the data collection device 122 via a direct wireless communication and is configured to communicate with one or more database via a network connection.

With reference again to FIG. 2, the activity safety metric 114 output by the data processing device 112 may be a risk score that indicates the worker's risk of an injury based on work condition inputs 116. The metric 114 may be used by a user receiving the metric 114 to make changes to the work conditions to reduce the risk of injury. In one form, the data processing device 112 provides the factors that caused the increased chance of risk to the user along with the activity safety metric 114. In another form, the data processing device 112 provides suggestions for how the risk of injury may be reduced base on the processed working conditions. The data processing device 112 may generate the activity safety metric 114 based on one or more work condition inputs 116. The work condition inputs 116 may include motion data, worker biometric data, worker specific data, employer specific data, environmental conditions, location data, temporal information, yield/throughput information, and/or commodity information which were described in detail in regard to FIG. 1 above.

The data processing device 112 may receive the work condition input 116 data and process the data to determine the activity safety metric 114. The data processing device 112 may compare the work condition input 116 data to data models that have been previously determined to represent increased risk conditions or safe conditions. The data models may be based on or include statistics, agency standards, worker injury studies, previously collected data, or any other information indicating the degree of risk posed by a certain working condition of the work condition inputs 116. For example, a data model or work condition standard may indicate that working outside for four hours without a break in temperature greater than 100 degrees Fahrenheit for over four hours substantially increases the worker risk of heat exhaustion. Where the work condition input 116 data is comparable to conditions known to increase risk, the data processing device 112 may be configured to adjust the activity safety metric 114 and/or the worker's risk of injury accordingly.

Figure 3:
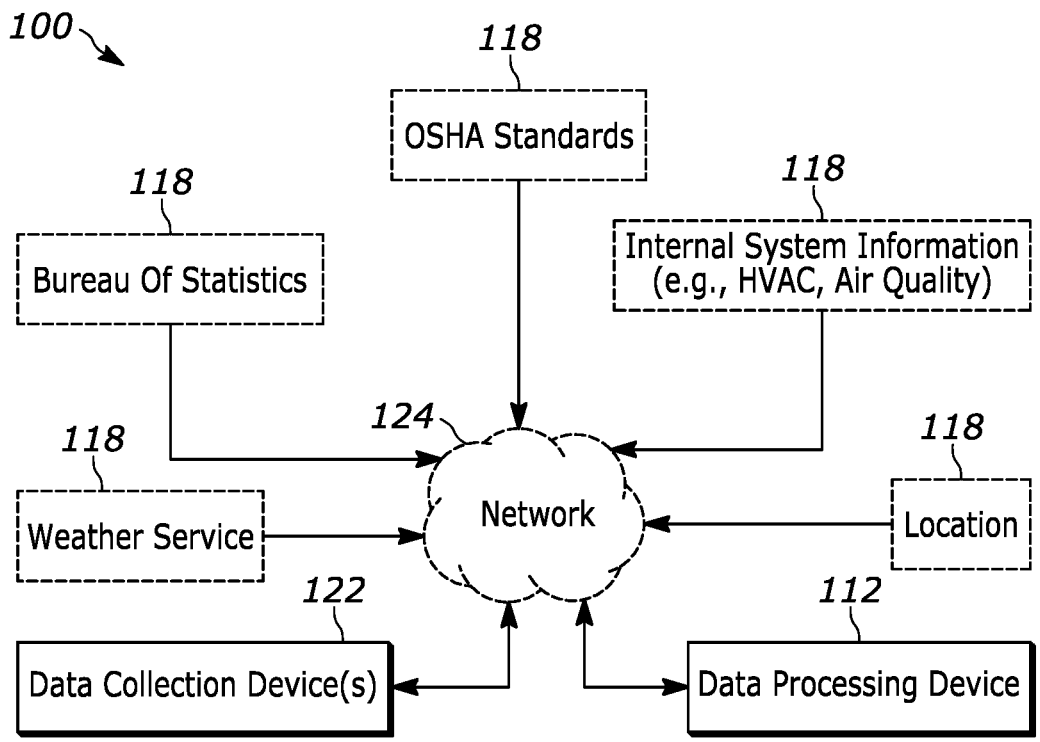
FIG. 3 is a schematic diagram of various example inputs and databases the data processing device of FIG. 2 may communicate with in assessing risk.

With reference to FIG. 3, the data processing device 112 may receive or generate data models based at least in part on the information received from various databases 118 and one or more data collection devices 122. The data processing device 112 may be connected to the databases 118 and data collection device 122 via a network 124, such as the internet and/or a cellular network as examples. The data processing device 112 may also use information received from databases 118 and data collection device 122 in determining the activity safety metric 114. The data processing device 112 may search the databases 118 for additional information in building a data model upon the receipt of input indicating a work condition. As one example, where the work location is input, e.g., Phoenix, Ariz., the data processing device 112 may communicate with a weather service database to retrieve current weather conditions of the weather conditions over a period of time in Phoenix, Ariz. The data processing device 112 may similarly request other information from a database 118 related to the location input received, such as the air quality, pollutants, oxygen density, elevation, etc. Where an input indicates the worker is working indoors, the data processing device 112 may be in communication with a thermostat of the worker's building to determine the temperature, humidity, HVAC conditions, air quality, etc. The databases 118 shown are given merely as examples.

In one approach, the data processing device 112 is in communication with a database that stores agency standards data 136 that provides OSHA standards. These standards may provide data and information pertaining to motion types that have been determined to be the cause of injuries. For example, the OSHA standards may indicate that forward bending for durations of more than three hours during a day significantly increase a risk of back injury in a worker. The data processing device 112 may build data models incorporating this information, so that when motion data is receive indicating forward bending for durations of more than three hours during a single day, the risk of injury is increased and reflected in the activity safety metric 114. As another example, the Bureau of Statistics may provide studies or statistics indicating a correlation of injuries common to certain worker roles or positions. Based on the correlation of certain injuries to specific worker roles, the data processing device 112 may be configured to make adjustments in determining the activity safety metric 114. As one example, a study may show a correlation between rotator cuff injuries and delivery drivers. The data processing device 112 may use this information when the it receives an input that the worker's role is a delivery driver to proactively monitor motion that uses the rotator cuff and suggest how to reduce injury. The databases 118 are given merely as examples and those having skill in the art will readily understand that any database 118 or source of information may be used to interpret and weigh the risk posed by the work condition inputs 116 may be consulted upon receiving information indicative of a condition of the work environment.

Figure 5:
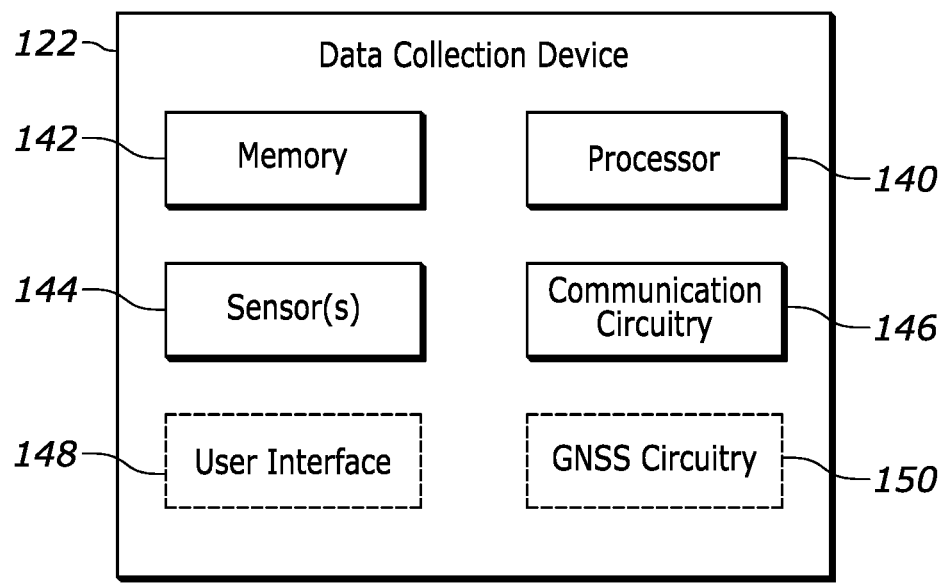
FIG. 5. is a block diagram of a data collection device of the system of FIG. 1.

The data processing device 112 may similarly receive information from the data collection device 122. The data collection device 122 may collect or generate data that is sent to the data processing device 112. With reference to FIG. 5, the data collection device 122 includes a processor 140, memory 142, one or more sensors 144, and communication circuitry 146. In some forms, the data collection device 122 is a smartphone. The smartphone may include an inertial measurement unit (IMU) that senses the motion of the user.

The processor 140 is in communication with the memory 142. The processor 140 may receive signals from the one or more sensors 144 of data collected by the sensors 144. The processor 140 may store the data collected by the sensors 144 in memory. In some forms, the processor 140 analyzes the data received from the sensors 144 and stores metadata extracted from the sensor data for storage in memory 142. In one form, the processor 140 filters the data received from the sensor 144 and only stores a portion of the sensor data received. For example, the processor 140 may sample the data at certain time intervals to reduce the amount of data stored in memory 142.

In some embodiments, the memory 142 is remote from the processor 140. The processor 140 may communicate the data collected by the sensor 140 and/or the processed sensor data to the memory 142 via the communication circuitry 146. The communication circuitry 146 may be used to communicate the sensor data to the data processing device 112. The communication circuitry 146 may be configured to communicate via direct and/or indirect communication protocols. As examples, the communication circuitry 146 may be configured to communicate via one or more of wireless fidelity (Wi-Fi), Cellular, radio frequency (RF), infrared (IR), Bluetooth (BT), Bluetooth Low Energy (BLE), Zigbee and near field communication (NFC). Other wireless protocols may also be used.

The data collection device 122 may collect information relating to a worker's activity using a sensor 144. In some embodiments, the sensor 144 is used to collect information relating to body motions of a worker using a motion sensor, for example, an optical device, such as a camera, or a motion detection device, such as an IMU (e.g., including one or more of accelerometers, gyroscopes, magnetometers, etc.). In the example where a camera is used, the camera may record video of a worker and use image processing techniques to determine a worker's motion across a series of image frames of the captured video. In examples where the data collection device 122 includes an IMU, the data collection device 122 may be on the worker's person during the workday. In one example, the data collection device 122 (e.g., a smartphone) is in the worker's pants pocket. In another example, the data collection device 122 is configured to be attached or clipped to a worker's belt, belt loop, pants, or other article of clothing. The data collection device 122 may be a wearable device that monitors a worker's movements. As some examples, the data collection device 122 may be or be integrated within a watch, shoe or hat.

In other embodiments, the sensor may collect information relating to the working environment of the worker including, as examples, a thermometer, barometer, anemometer, and other location or weather-related sensors. In some embodiments, multiple data collection devices 122 are used to provide information to the data processing device 112.

As shown in FIG. 3, the data collection device 122 is in communication with the data processing device 112. The data collection device 122 may send the generated or collected data to the data processing device 112 via the communication circuitry. In one embodiment, the data collection device 122 and the data processing device 112 are in direct communication with each other. In one example where the data collection device 122 is a smartphone, the data processing device 112 is part of the smartphone and share the same memory and processor. In this embodiment, the data collection device 122 does not need to send any information or data to the data processing device 112 since the data processing device 112 may access the memory of the data collection device 122 directly. In other embodiments, the data collection device 122 is connected to a network 124 and communicates the collected data to the data processing device 112 via the network 124.

In some embodiments, the data collection device 122 may include a user interface 148 and/or GNSS circuitry 150. The user interface 148 may be a touchscreen display, a microphone and speaker, button, and/or an indicator light as examples. The user interface 148 may receive input from a user. The user may enter information about a worker including biometric information, the type of work being performed, the worker's role, the worker's location, the length of a worker's shift, a worker's work schedule, yield/throughput information, and/or commodity information. The user interface 148 may also output information to a user. In one form, the user interface 148 outputs an indication that the information the user input into the data collection device 122 has been successfully received. This may be a notification or message appearing on a touchscreen display. In another form, the data collection device 122 receives communication from another device, such as the data processing device 112, indicating a safety metric of the user which is displayed to the user via the user interface 148. As one example, the data collection device 122 may vibrate or sound an alarm upon receiving a communication indicating the worker is at risk of an injury. In another example, the data collection device 122 may display a score indicating the worker's risk of injury based on the working conditions.

The GNSS circuitry 150 may be used to determine the location of the data collection device 122 using the Global Positioning System. The processor 140 may store the determined location in memory 142 and/or communicate the location of the data collection device 122 to the data processing device 112 for use in processing data. The location data may, for instance, be used to determine the weather conditions in the area where the data collection device is determined to be located. As another example, the location data may be used to track how far a worker travels throughout a workday.

The data collection device 122 may communicate the data collected in real time or may store the data and transmit the data periodically. In one approach, the data collection device 122 transmits the data collected to the data processing device 112 for processing once an hour. In another approach, the data collection device 122 transmits the data collected to the data processing device 112 for processing once a day, for example, at the end of the shift or workday.

Figure 6A:
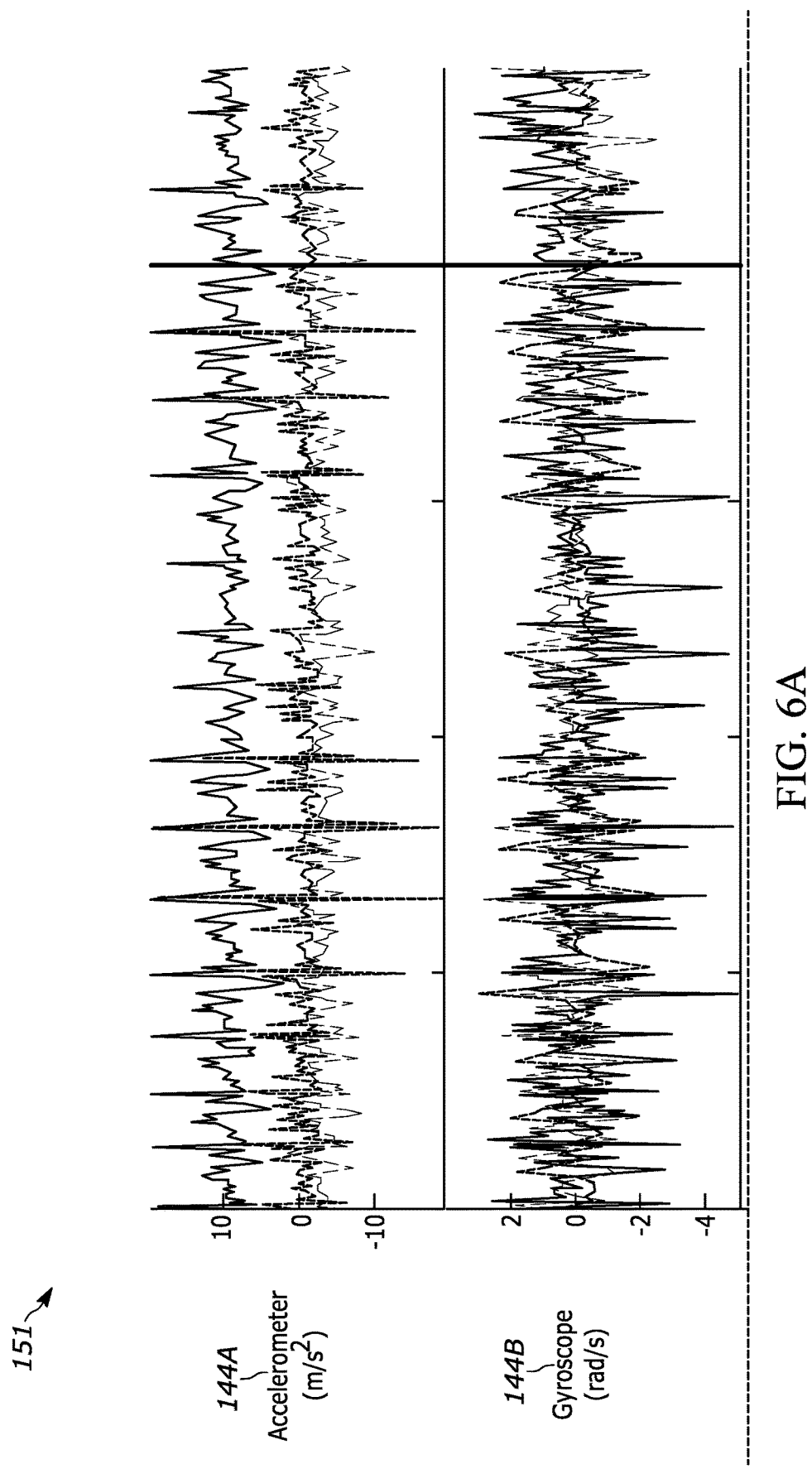
FIGS. 6A-B are examples of motion data collected by the data collection device of FIG. 1.

With reference to FIG. 6A, an example of data 151 collected by various sensors 144 is shown. The sensors 144 include an accelerometer 144A, gyroscope 144B, magnetometer 144C, and barometer 144D. Each of the sensors 144 collects data over time and may be communicated to the data processing device 112. The accelerometer 144A, gyroscope 144B, and magnetometer 144C are shown to collect data in the X, Y, and Z axes and thus are shown to each include three lines of data. The sensor data 151 is then processed to determine the motions performed by the worker and/or environmental conditions over a period of time for use in generating an activity safety metric. While the example data 151 shown includes data collected by multiple sensors 144, the data processing device 112 may also be configured to process only a subset of the data collected and/or received from the data collection device 122. Similarly, it should be understood that each one of the data inputs may, itself, be comprised of multiple pieces of data as well.

Figure 6A:
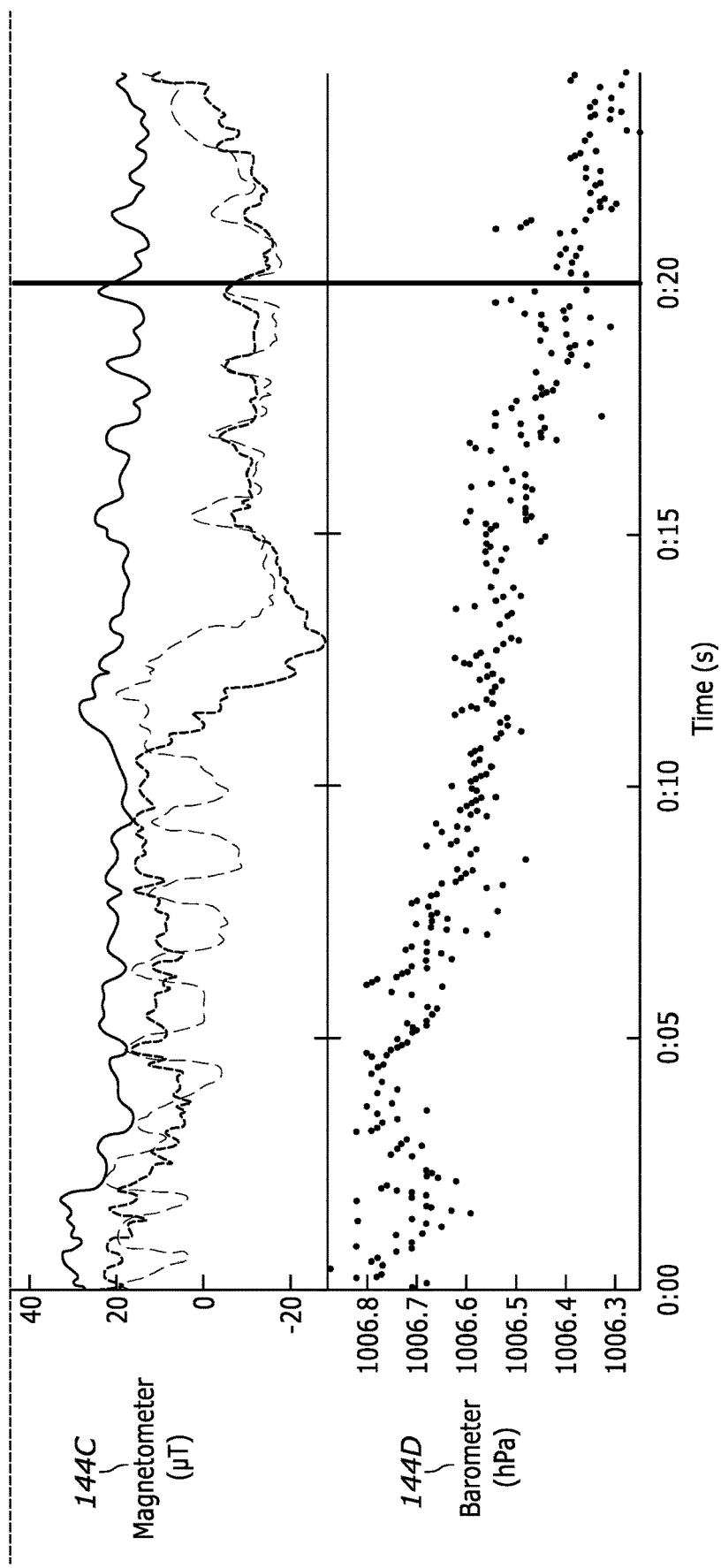
Figure 6B:
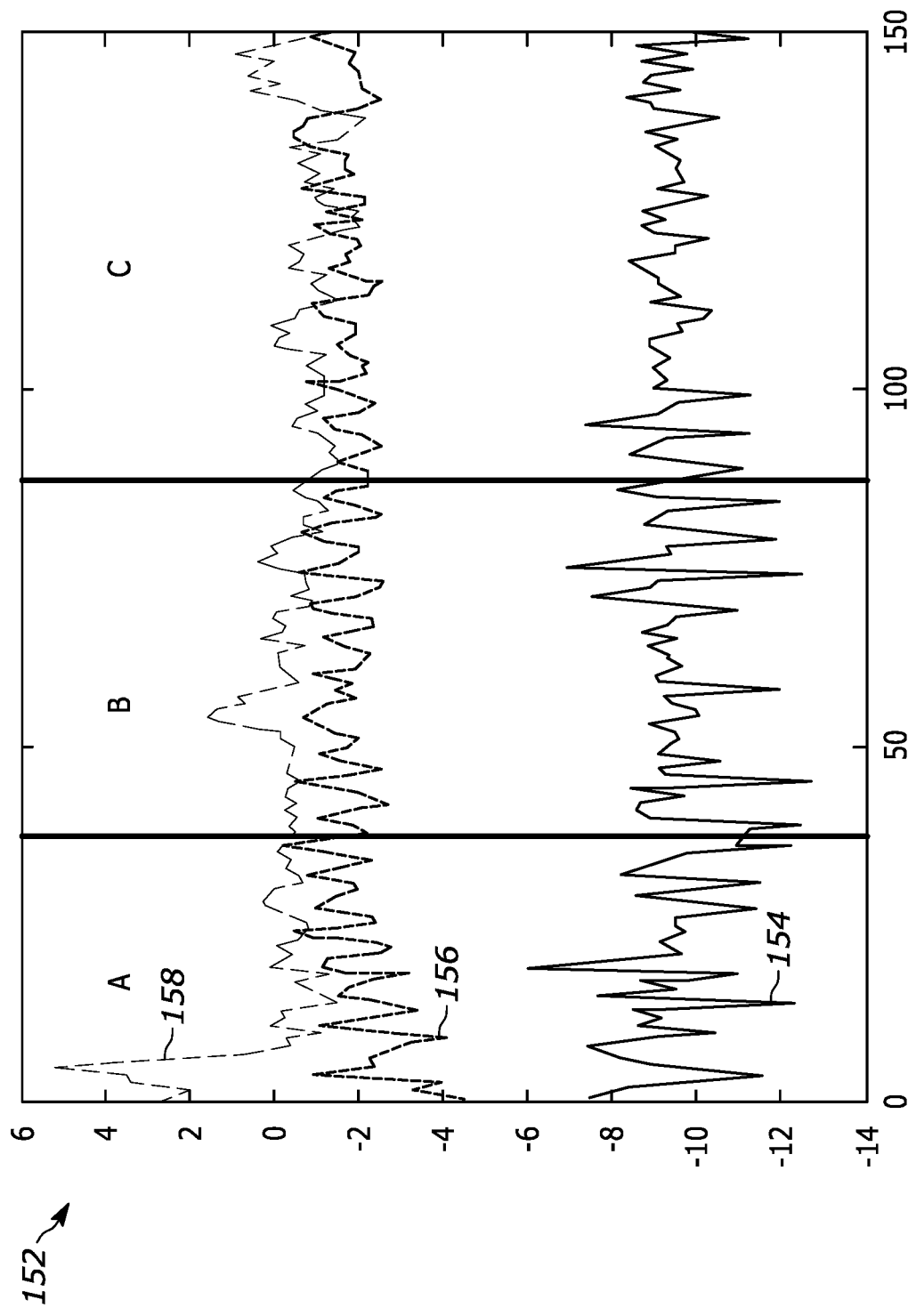

With reference to FIG. 6B, an example of motion data 152 collected by a sensor 144 of the data collection device 122 is shown. The motion data 152 may be motion data collected by the accelerometer 144A, gyroscope 144B, or magnetometer 144C shown in FIG. 6A (or even other sensors) as data collected by each of these sensors may be similarly processed as described below. In the example shown, the data includes an X-axis component 154, a Y-axis component 156, and a Z-axis component 158. The motion data 152 may be communicated to the data processing device 112 for processing. The data processing device 112 may compare the motion data 152 with data models, such as the motion type data 132, associated with known motion types. The data processing device 112 may determine segments of the motion data 152 that correlate to one or more discrete motions and determine the motion type for each data segment. As shown in FIG. 6B, the data processing device 112 may indicate the motion data 152 includes three different segments A, B, C that represent individual motions. The data processing device 112 may then compare each motion segment to motion type data models known to represent certain motion types. Where a correlation between the data segment and a motion type data model is high, the data processing device 112 may categorize the data segment as representing that motion type. The data processing device 112 may determine whether the motion type for a segment of data collected by one sensor 144 matches the motion type for a segment of data collected by another sensor 144 during the same time period. For example, if the motion data collected by the accelerometer 144A and gyroscope 144B both are determined to correspond to a certain motion type (e.g., bending), the data processing device 112 may increase its confidence that the determined motion type.

Once the data processing device 112 has made an initial association or categorization of the segments of the motion data 152, the data processing device 112 may further analyze the segment categorization to determine whether the segment categorization is probable in view of the surrounding segment categorizations. For example, if each motion segment is approximately 50 milliseconds long, and segments A and C are associated with the motion type of "running" and segment B is associated with the motion type of "fall", the data processing device 112 may determine that a "fall" is unlikely to have occurred in that 50 millisecond segment. The data processing device 112 may similarly be configured to apply algorithms to determine whether the categorizations of each of the segments are probable for other motion type categorizations. The data processing device 112 may be trained to identify when a motion categorization segment is not probable based on training sets. A training set, for example, may be generated by a user manually tagging data segments to indicate what motions a user is actually performing for each motion segment. The data processing device 112 may process these training sets and determine the approximate length of time required for each motion, what motions types occur relative to one another, etc. to develop an algorithm for evaluating the likelihood of the segment categorizations.

Figure 7:
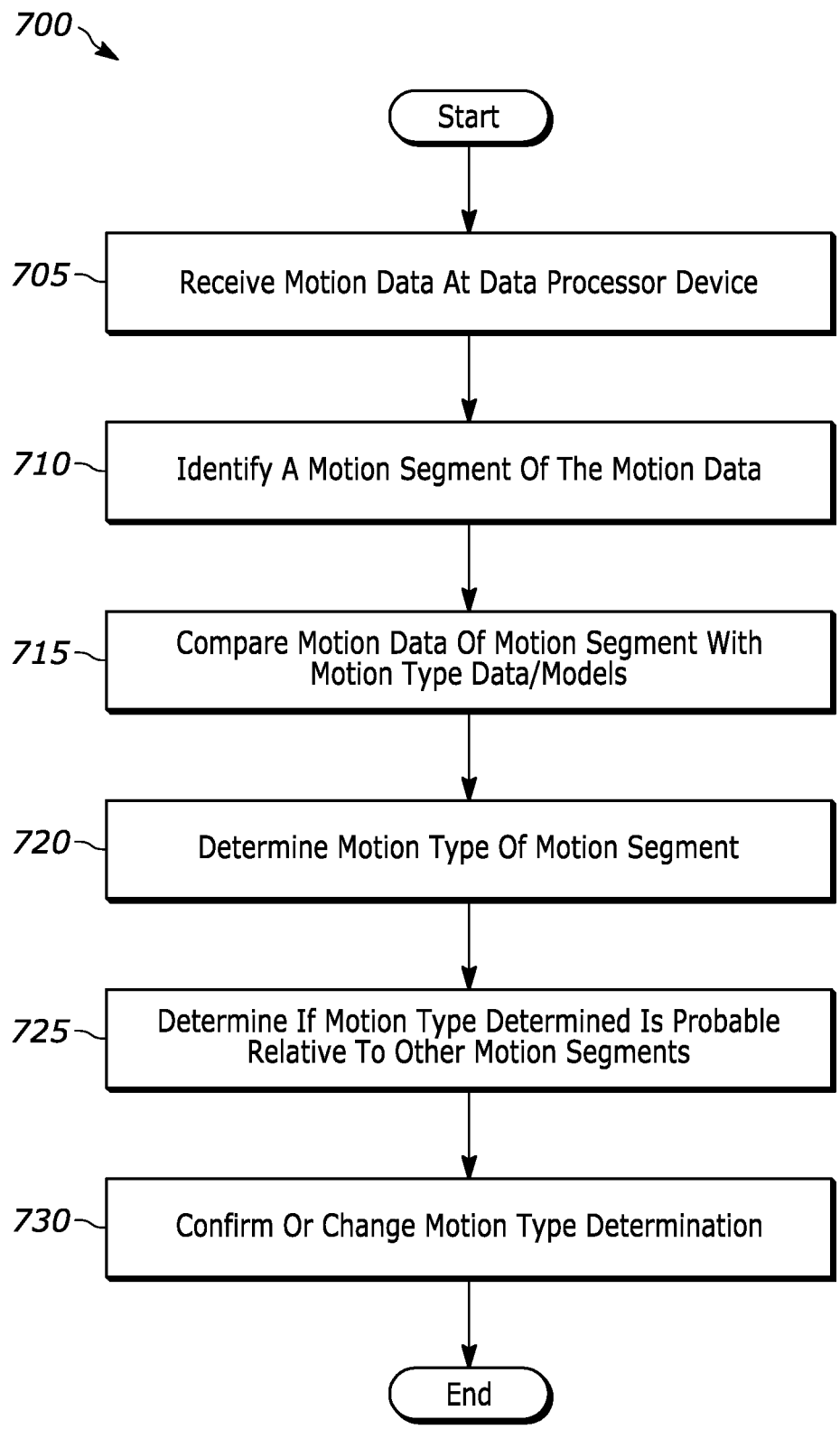
FIG. 7 shows a flow diagram for determining a motion type based on motion data at the data processing device of FIG. 4.

With reference to FIG. 7, an example method 700 for categorizing the motion segments is described. The data processing device 112 receives 705 the motion data from the data collection device 122 or memory 128. The data processing device 112 may receive the motion data either directly or via network 124. The data processing device 112 applies a motion type detection algorithm to the motion data received to identify the types of motion in the motion data. The data processing device 112 may retrieve the motion type detection algorithms from the memory 128. Using the motion type detection algorithm, the data processing device 112 identifies 710 segments of the motion data associated with a single motion. A single motion may be comprised of multiple motions performed at the same time, for example, a squat and a twist. The data processing device 112 then compares 715 the motion data with the motion type data or motion type models stored in memory 128. The motion type data or motion type models may be part of the motion type detection algorithm. In another form, the motion type detection algorithm performs the comparison of the motion segments to the motion type data models. The motion type data models may be, as an example, sets of motion data collected and known to represent a certain motion type. For instance, a user previously analyzed a worker as they performed motions and tagged the data segment as representing certain types of motion. As an example, a user observed a worker perform a squat motion and tagged the corresponding motion data as representing a squat. The motion data models may comprise multiple sets of data known to be associated with each motion types.

Based on the comparison, the data processing device 112 determines 720 the motion type of the motion segment. The data processing device 112 may compare each segment of the motion data with each of the known motion type data models stored in memory 128. The data processing device 112 may calculate a correspondence value between the motion data of a motion segment and the motion type data models. This may be done, as an example, by generating a correlation value between the X-, Y-, and Z-components of the motion data and the X-, Y-, and Z-components of the motion type data models, for example using a pattern recognition technique or machine learning techniques. The data processing device may use Gaussian or Hidden Markov models to perform the pattern recognition for determine the motion type of a motion data segment. Based on the correlation between the motion data and the motion type data models, the data processing device 112 may determine a correspondence value. The data processing device 112 may determine that the motion data segment represents the type of motion associated with the motion type data model that produces the highest correlation value. In another example, the data processing device 112 may require that a minimum correlation value be generated for the motion data segment to be categorized as a motion type (e.g., greater than 50%). In yet another example, the data processing device 112 generates a correlation value of the motion data segment with each motion type data model and compares the correlation value of the highest and second highest correlated motion types. If the difference between the highest and second highest correlation value is significant, the data processing device 112 may conclude that motion type generating the highest correlation value is a significantly better match and conclude the motion data segment is that motion type.

The data processing device 112 then may determine 725 whether the motion type categorization for each motion segment is probable in view of the motion type categorizations of the surrounding motion segments. This step may smooth the data to filter out noise in the motion data or outliers that do not make sense relative to the surrounding motion data. For instance, the data collection device 122 may capture data corresponding to motions that are improbable in view of the motion that occur prior to and after that motion segment. The data processing device 112 may determine whether a motion categorization is improbable using one or more methods described in regard to FIG. 6 above. The data processing device 112 may apply one or more machine learning algorithms to determine whether the motion type categorization is probable or not.

Based on the probability of the motion segment categorization the data processing device 112 may confirm or change 730 the motion type categorization. For instance, where the worker is running over the course of a span of time surrounding the segment improperly categorized as the worker falling, the data processing device 112 may recategorize that motion segment as running. If the motion segment is probable, the data processing device 112 may confirm the motion type categorization.

Figure 8:
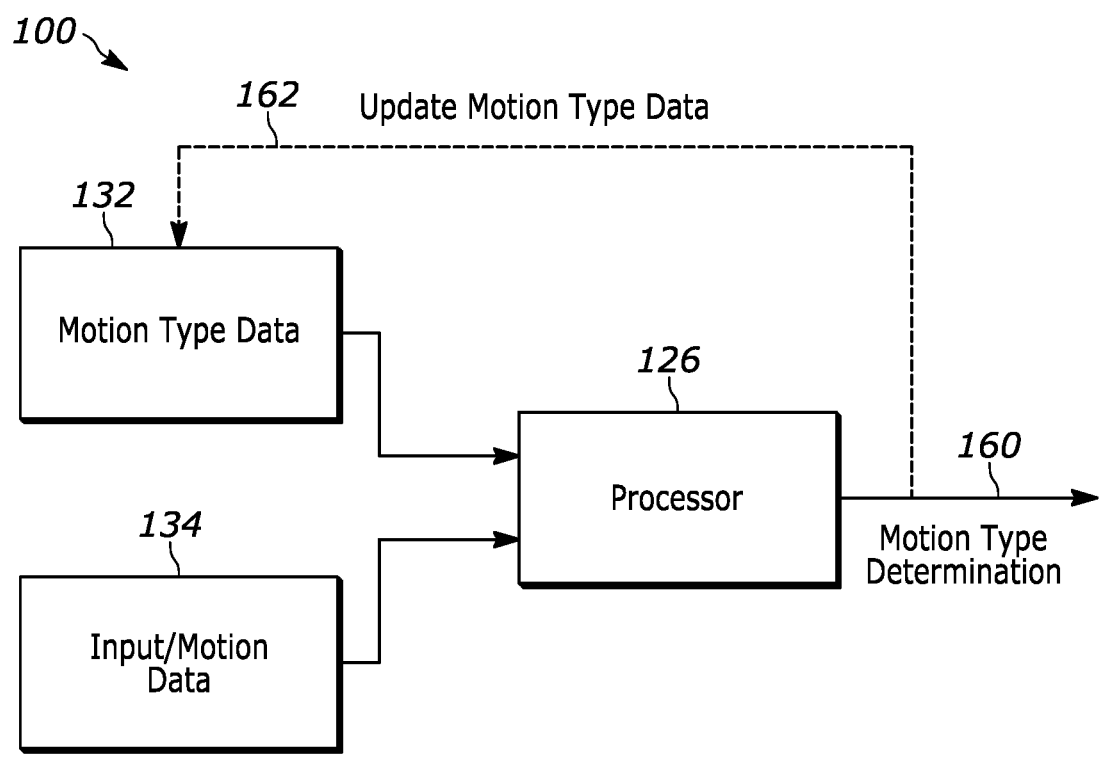
FIG. 8 is a schematic diagram of the data processing device of FIG. 4 determining the type of motion based on input data.

The data processing device 112 may also use the motion data that was determined to be correctly and/or incorrectly categorized to improve the motion type data or models stored in memory 128. With reference to FIG. 8, a processor, such as processor 126 of the data processing device 112, receives the input/motion data 134 and the motion type data 132 and outputs 160 a motion type determination. In making the motion type determination, the processor 126 may determine the motion type of each motion segment as described above and recategorize the motion categorization based on whether the categorization is probable or not. Once the motion type has been determined, the processor 126 may output the motion type determination and/or store the motion type that occurred in memory 128. The processor 126 may also use the motion data that was determined to be a certain motion type to update 162 the motion models stored in memory 128. For example, if a series of motion segments were categorized as "running," the processor may add the motion data of the motion segments to the motion type data or data models associated with "running." As another example, the processor 126 may adjust the motion type data or motion type data models based on the categorized motion data. This may involve including the motion data in a recalculation or averaging the motion data associated with a certain motion type. In another example, the motion type data is stored and associated with the categorized motion type for comparison with motion segments collected in the future. In one form, the motion type models are specific to each worker and are updated based on the worker's motion data collected by the data collection device 122 of the worker.

Where the worker motion is determined to be incorrectly categorized (e.g., at step 725 of method 700), the data processing device 112 may compare the motion data of that segment with the motion type models to update or adjust the motion type data models. For example, the processor 126 may update or adjust the motion type data models the motion segment was recategorized as such that similar motion data is properly categorized in the future. The processor 126 may also adjust the motion type data model that incorrectly produced a high correlation value to the motion data so that similar data is not categorized as representing that motion type in the future.

Figure 9:
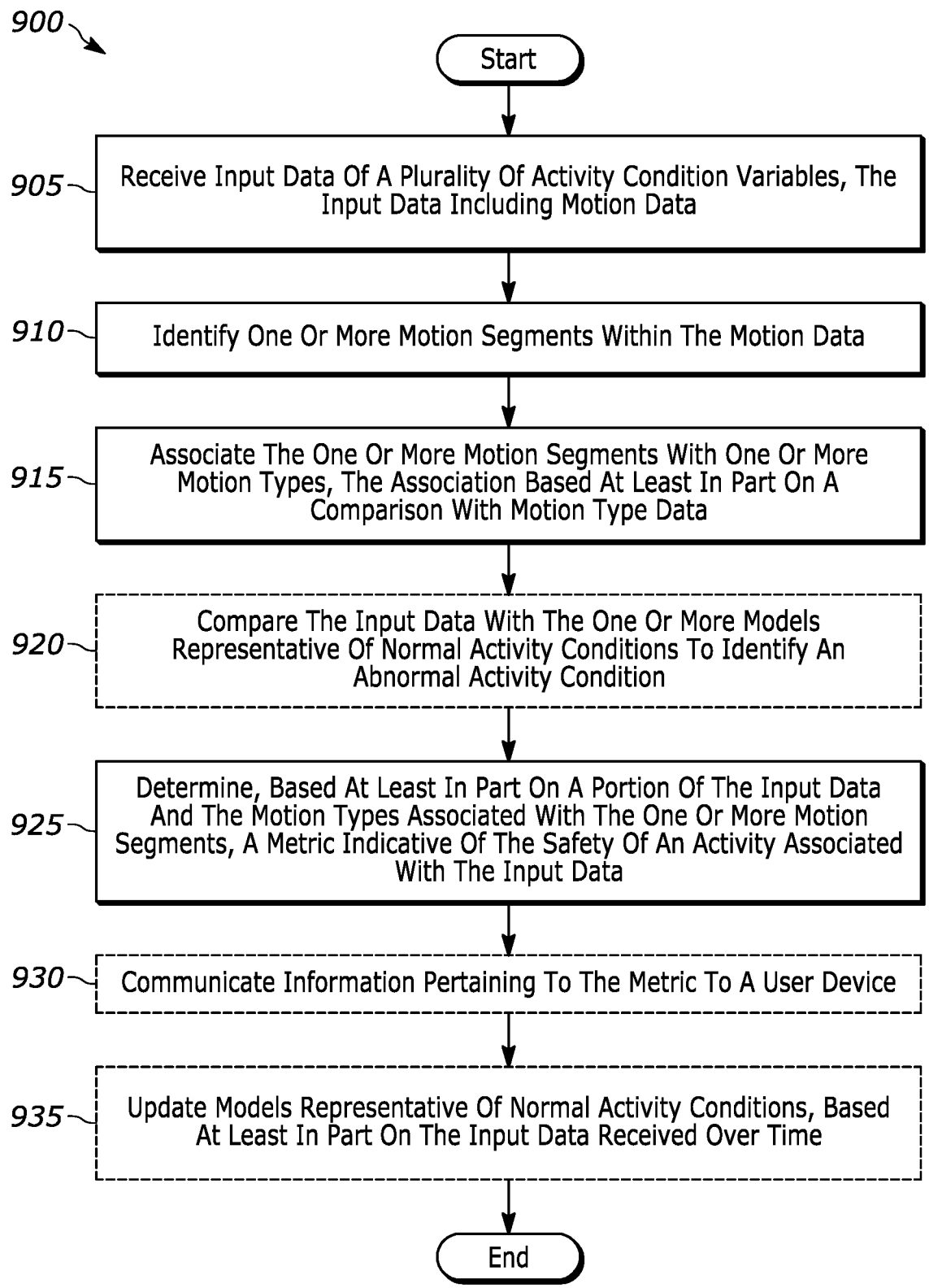
FIG. 9 shows a flow diagram for determining a metric indicative of the safety of an activity based on input data.

Once the motion type data has been extracted from the motion data over a period of time, for instance, a workday or shift, a safety metric may be determined or calculated based on the motion type data and the other input variable data. With reference to FIG. 9, a method 900 is provided for outputting a safety metric based on the data inputs. The data processing device 112 receives 905 the input data for a plurality of activity condition variables, including motion data. The input data may be entered into a user interface of a device such as a data collection device 122, a smartphone, tablet, or personal computer as examples. The activity condition input data may also be received or retrieved from a database such as a weather database or other information source relevant to the working conditions of a worker, as described above in regard to FIGS. 3 and 4.

The data processing device 112 may then identify 910 one or more motion segments within the motion data using one or more methods described above. The data processing device 112 may then associate 915 the motion segments with motion types, for example, by comparing the motion data with the motion type data models stored in memory 128.

The data processing device 112 may compare 920 input data and the associated extracted metadata collected from the input data (e.g., motion types of the motion data) with one or more activity condition models that are known to represent normal activity conditions. By comparing the input data to the normal activity condition models, the data processing device 112 is able to determine abnormal conditions within the motion data. For instance, the normal activity condition model may have a temperature of 70 degrees Fahrenheit. Where the temperature of the working conditions is more or less than this normal condition, the data processing device 112 may determine that abnormal conditions or conditions prone to cause worker injury are present. A normal activity condition may exist for each input variable received by the data processing device 112. The normal activity conditions may be set or entered by a user or may be collected and updated by the data processing device 112 over time based on the previously collected input data or databases 118.

The data processing device 112 then determines 925 a metric indicative of the safety of an activity associated with the input data. This metric is based at least in part on a portion of the activity input data and the motion types extracted from the motion data. The data processing device 112, may increase the risk score or safety metric based on the degree of deviation from the normal activity condition model. For example, where the normal temperature is 70 degrees Fahrenheit, a temperature of 75 degrees may only slightly increase a worker chances of risk or injury. A significant deviation from the normal condition model, for example 105 degrees Fahrenheit, may result in a greater impact on the safety metric or risk score. Certain abnormal conditions known to significantly increase a worker's risk of injury may affect the determined metric more than other abnormal conditions. The degree to which the presence of abnormal conditions affect the safety metric may be based on statistics provided by or retrieved from a database such as the Bureau of Statistics or OSHA standards as examples.

In another aspect, where the commodity being handled by workers is normally 10 lbs., input indicating the commodity being handled over a period of time is 15 lbs. or 25 lbs. may impact the safety metric as a function of the degree to which these weights deviate from the normal condition models. The data processing device 112 may further weigh the deviations from the normal condition models for the other activity condition input factors. For instance, where the commodity being handled is 15 lbs. heavier than in the normal condition model and a worker has done 30% more bends throughout the day, the data processing device 112 may determine that this combination significantly increases the risk of a back injury in the worker and compound the effect on the risk score accordingly.

The data processing device 112, upon generating a safety metric, may communicate 930 the metric or information pertaining to the metric to a user. In one example, the user has a user device, such as a smartphone, running an application. The data processing device 112 may send the metric to the user device and present it to the user via the application running on the user device. Where the data processing device 112 is part of the user device, the data processing device 112 may present the metric to the user in the form of a notification or within an associated application running on the user device. In some embodiments, the metric is not presented to a user, but rather information pertaining the metric is presented. For example, the information pertaining to the metric may include the activity condition variables or factors that caused a reduction or increase in the metric and/or how the user can reduce or increase the metric. In the example where the metric is a risk score, with a higher score indicating a greater chance of risk, a list of ways a user can lower their risk of injury may be presented. In other embodiments, both the metric and information pertaining to the metric are presented.

The data processing device 112 may update 935 the models representative of normal activity conditions based on the input data received over time. For instance, if a worker is continuously working in 80 degrees Fahrenheit heat rather than 70 degrees Fahrenheit heat, over time, the data processing device 112 will update the normal motion models to indicate that the normal working temperature is 80 degrees. Even where the activity conditions are "normal," the safety metric may be impacted. For instance, where a worker is normally working in 80 degrees heat, the risk of heat exhaustion or dehydration may be increased over a lower temperature (e.g., 70 degrees). The normal motion models may be used to flag or indicate when abnormal conditions are present for review by the data processing device 112. For instance, where irregular motion is determined to have occurred, e.g., a fall, the data processing device 112 may further evaluate that motion data to determine whether the abnormal condition actually occurred and to determine conditions that may have caused the fall (e.g., heat exhaustion or icy conditions).

Figure 10:
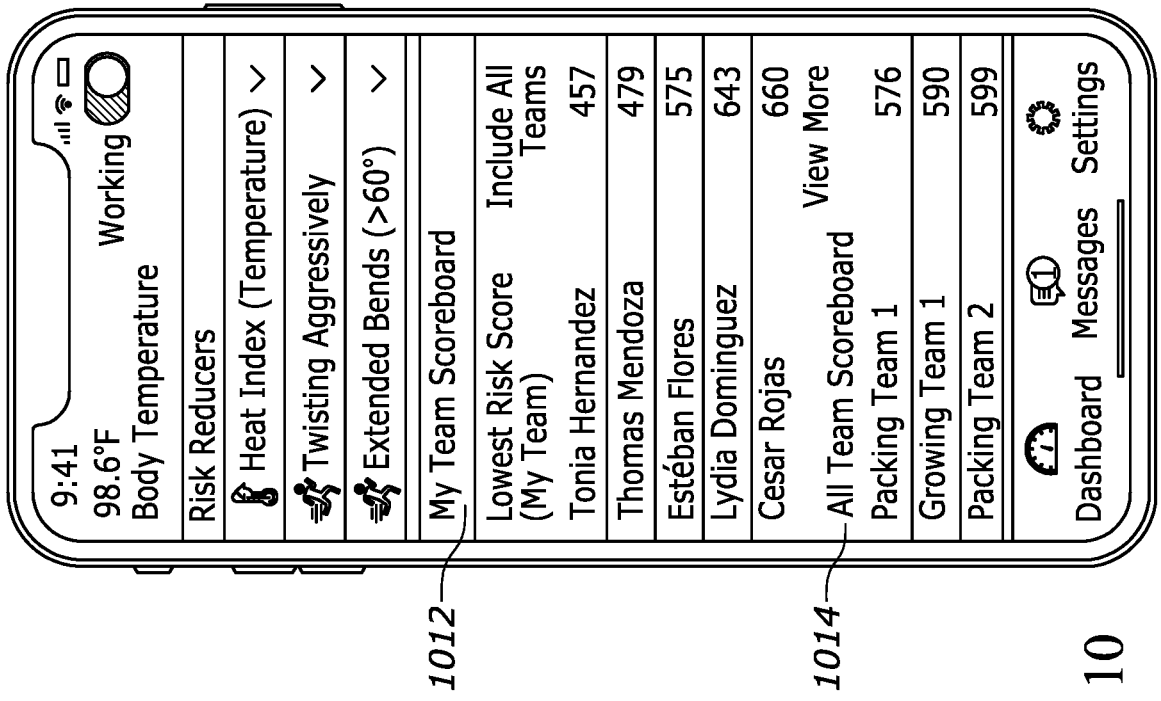
FIG. 10 shows example screenshots of an application of a user device for displaying activity metrics and factors increasing risk to a user.
Figure 10:
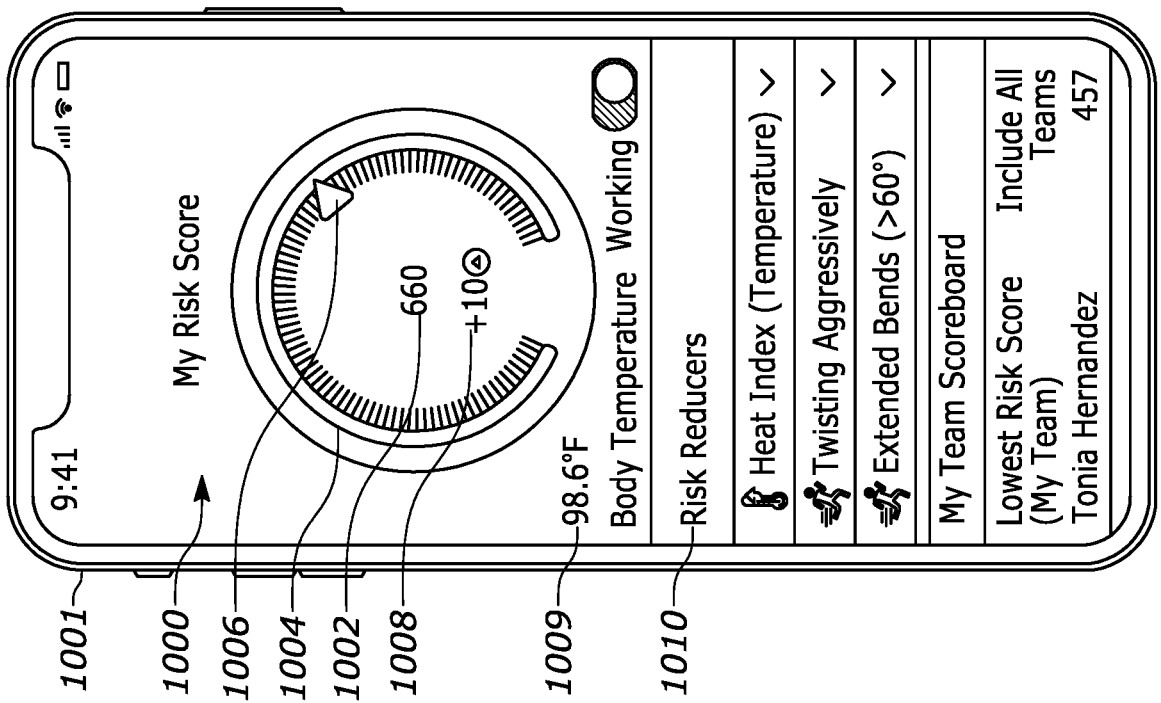

With reference to FIG. 10, an example application 1000 running on a user device 1001, such as a smartphone, tablet, or personal computer is shown. As shown, the application 1000 displays the safety metric 1002 to the user. The application 1000 may also display a graphic 1004 to the user indicating the degree of risk posed by the worker's safety metric. As shown the indicator 1006 of the graphic 1004 shows that the safety score is higher than average, indicating that the risk of injury is higher than average. The application 100 also displays that change 1008 in the risk score from the previous day, i.e., increased by 10 points. The application 1000 may also display a worker's temperature 1009 that was monitored by a data collection device 122 or recorded and input into the system.

The application 1000 may also provide a list of risk reducers 1010 for the worker. In the example shown, factors causing the higher risk score are shown. A user may be able to click on or select these factors to see a list of ways or things the worker can do to reduce their chance of injury. For example, if the worker selects "Heat Index (Temperature)" the application 1000 may display that taking breaks frequently and consuming an increased amount of fluids will reduce their risk of injury.

The application 1000 may also further display the risk scores or safety metrics of other members 1012 of the worker's team. This may indicate to a worker having a high risk score that other members of the team are able to do the same or similar tasks with a lower risk score. A worker may then be able to observe or consult with the other members of their team on how to perform tasks and maintain a low risk score.

The application 1000 may further display the risk scores of the various teams 1014 at the job site. Where certain tasks result in significantly higher risk than other tasks, a supervisor may decide to rotate the teams tasks after a period of time so that the overall risk of injury is reduced for the team members performing the task with increased chances of risk.

Figure 11:
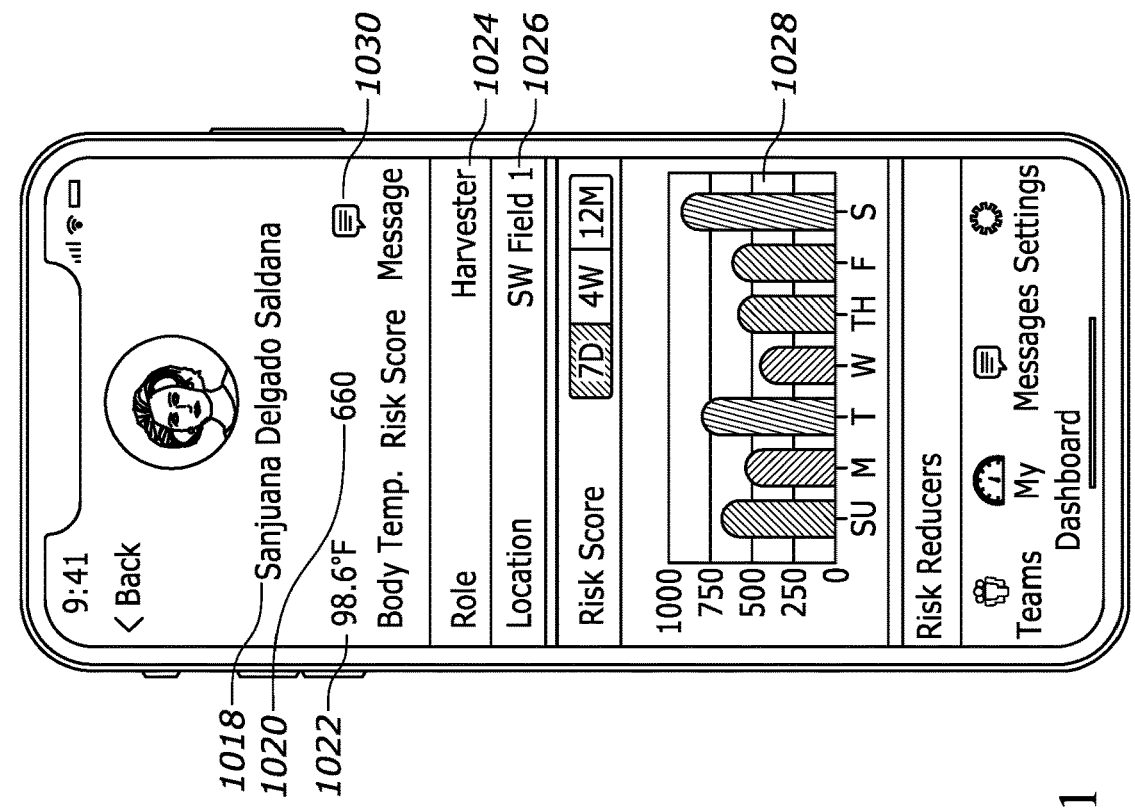
FIG. 11 shows example screenshots of an application of a user device for viewing the risk scores of a team and/or a worker.
Figure 11:
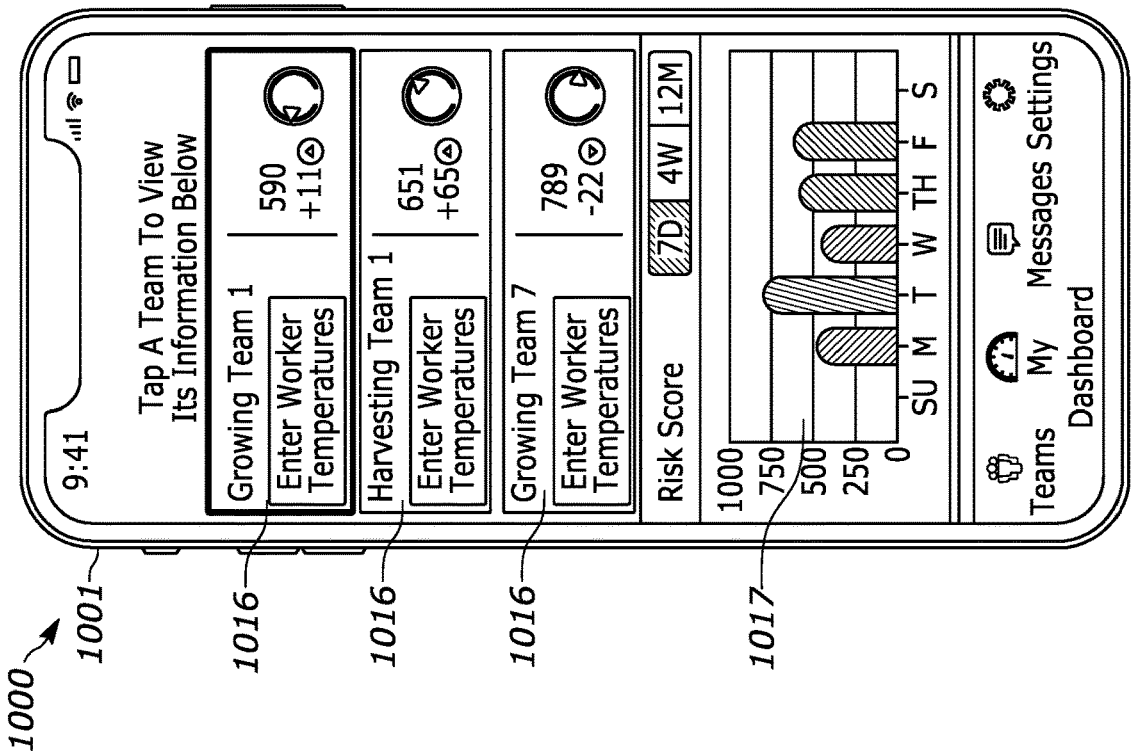

With reference to FIG. 11, another aspect of the example application 1000 is shown. As shown, the risk score of each team 1016 is displayed. This may be used by the supervisor to determine the risk of injury that each worker is subjected to when performing a certain task. The supervisor may then take action based on these scores to develop method for performing the task in a way that reduces the chances of injury to the workers. As shown, each team may be selected. A graphic 1017 showing the risk scores of the team over time are displayed. A supervisor may view these graphics to monitor the trend in risk scores of the team over time. For example, whether the teams risk score has been reduced after implementing a new method of performing a task.

A supervisor may also select to view the risk score of each worker. As shown, the workers name 1018, the risk score 1020, the worker's recorded body temperature 1022, role 1024, and location 1026 are displayed. A graphic 1028 showing the worker's risk score over time may also be displayed to a user. A supervisor may also select to message 1030 the worker, for instance, to let them know they need to take a break or to come speak with them about their risk score.

Figure 12:
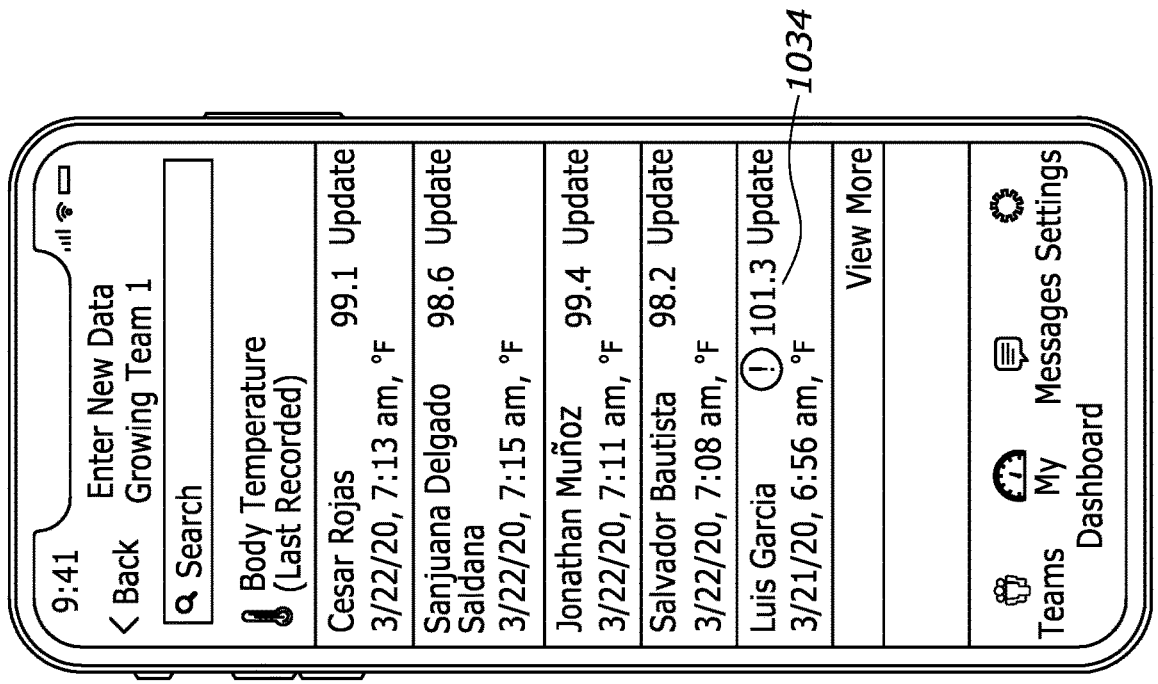
FIG. 12 shows example screenshots of an application of a user device for inputting worker data.
Figure 12:
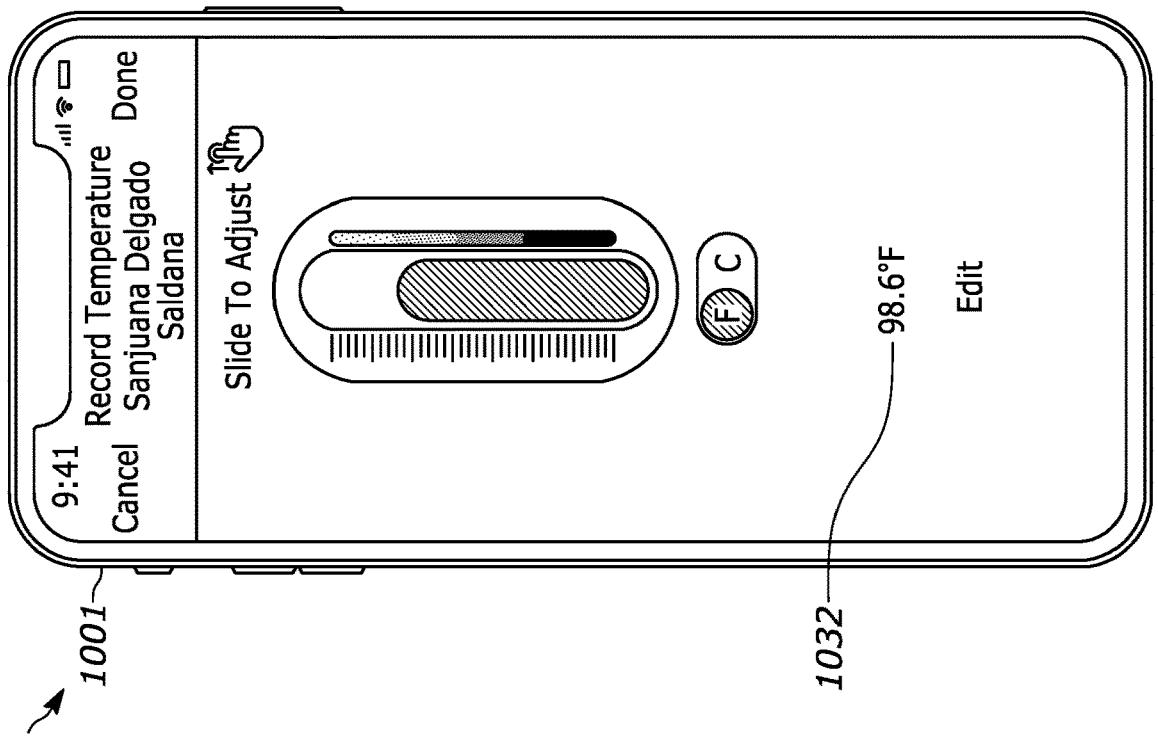

With reference to FIG. 12, the worker or a supervisor may check and record 1032 the temperature of a worker within the application 1000. As an example, the supervisor may check the temperature of each employee before the beginning of each shift to make sure that workers that are running a fever do not work. This may be done to prevent a sick worker from infecting the other workers of the team. Where the worker is working in a hospital or nursing home, as example, monitoring the temperature of the workers before the shift may be done to protect the patients from illness.

The temperatures of multiple workers may be viewed, for example, by the supervisor. The supervisor may be notified or alerted 1034 when an employee is determined to have a high temperature or fever. The supervisor may then take action to send the worker home and notify the sick worker's coworkers to take preventative measures to prevent the spread of the illness.

Figure 13:
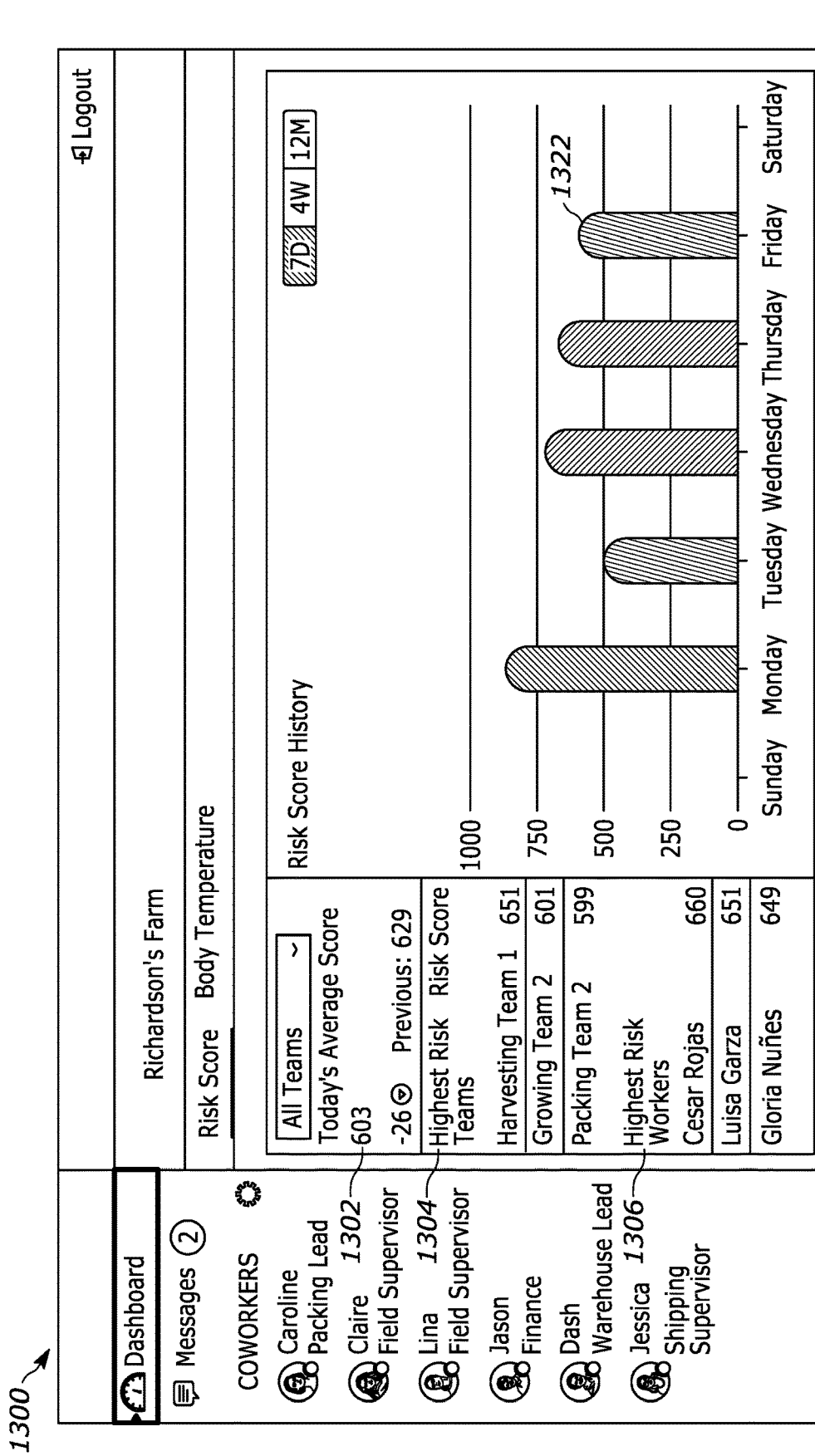
FIG. 13 shows an example display on a user device for viewing activity metrics associated with worker teams and/or individual workers.

With reference to FIG. 13, an example display 1300 is shown for viewing the activity metrics of various teams and workers is shown. A supervisor can view all of the activity safety metrics for a time period for the entire company, e.g., Richardson's Farm. For example, the display 1300 may show the average risk score 1302 of all of the workers at Richardson's Farm. The display 1300 may show the teams that have the highest risk scores 1304 along with the workers with the highest risk scores 1306. This provides the supervisor with the opportunity to address these teams and workers to instruct them how to perform their job in a way that reduces their risk of injury.

The supervisor can also select to view information regarding the teams and workers at the company. As shown the display 1300 allows a supervisor to view each of the teams at the company. Each team name 1308 is displayed along with the team supervisor name 1310, the location at the jobsite 1312 (e.g., northwest field), the team risk score 1314, the team risk score goal 1316, and the change 1318 from the previous day. The team risk score goal may be a risk score that the team is trying to stay below for a certain time period.

The supervisor may also select to view information about each worker including, as examples, their name, which team they work on, the location at the jobsite they work at, their risk score for the day, their personal risk score goal, and the change in risk score from the previous day.

When a team or a worker is selected, the display 1300 may show a chart or graph 1322 of the team or worker's risk score over a period of time. As shown, periods of time of seven days, four weeks, and 12 months may be selected although other periods of time may be used.

Figure 14:
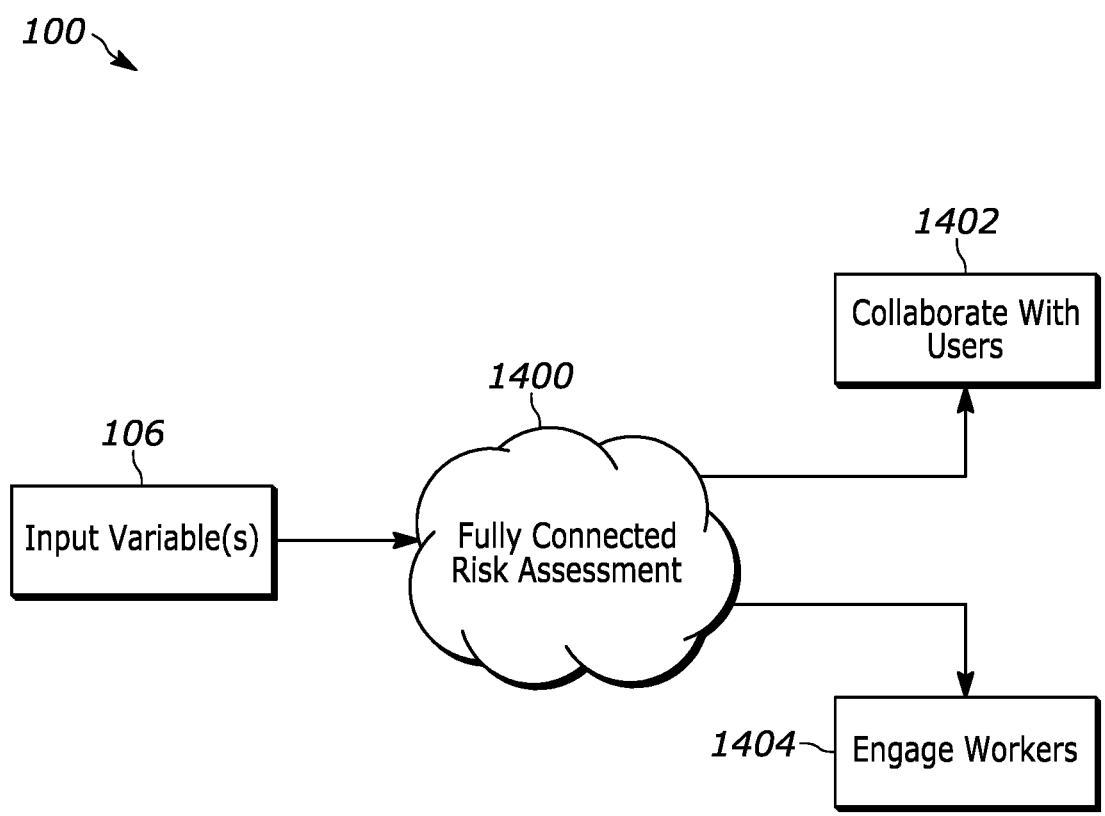
FIG. 14 is a schematic diagram showing the user interaction of the system of FIG. 1.

With reference to FIG. 14, in another aspect, system 100 receives the input variables 106 and performs a fully connected risk assessment 1400 of a worker's risk of injury based on a plurality of input factors captured by the input variables. The system 100 evaluates the working conditions and assesses the level of risk a worker is at based on the working conditions. The system 100, having assessed the working condition input variables, then is able to collaborate with users 1402 and engage workers 1404.

Collaboration with users 1402 includes providing an output based on the input variables 106 to a system user. As an example, the collaboration may provide a review of an individual worker's risk assessment and/or a term of multiple workers' risk assessment for analysis by a system user.

Engaging workers 1404 includes providing the risk assessment to the workers and providing measures or steps a worker can do to lower their risk score or to prevent risk of injury. For example, where a worker is performing too many forwards bends in a day, the system 100 may suggest that the worker bend at the knees and reduce the number of times the worker is bending at the waist.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A system for providing a worker risk assessment, the system comprising:
    a sensor collecting body motion data of a worker;
    a memory storing activity models associated with motion types and/or normal activity conditions; and
    a processor in communication with the sensor and the memory, the processor configured to:
        receive one or more input variables including the body motion data of the sensor and other non-body motion related data, the non-body motion related data including working condition data of the worker collected along with the body motion data;
        determine, based at least in part on a comparison of the one or more input variables with the activity models, a metric indicative of the safety of an activity associated with the one or more input variables; and
    communicate the metric to a user device associated with the worker along with information pertaining to the metric indicating one or more actions for the worker to take to reduce risk of injury based on the body motion data and non-body motion related data.

2. The system of claim 1 wherein at least one input variable of the one or more input variables associated with other non-body motion related data comprises one or more of the following inputs: worker specific input, employer specific input, environment input, temporal input, yield or throughput input, and/or commodity input.

3. The system of claim 2 wherein the at least one input variable of the one or more input variables associated with other non-body motion related data includes worker specific input which includes at least one of the following worker metrics: age, years of experience in role, biometrics, gender, location, role, industry, pre-existing conditions, symptoms.

4. The system of claim 2 wherein the at least one input variable of the one or more input variables associated with other non-body motion related data includes employer specific input which includes at least one of the following employer metrics: Assessment of slip/trip/fall hazards, heat illness prevention preparedness or the maturity of the employer's safety plan and processes.

5. The system of claim 2 wherein the at least one input variable of the one or more input variables associated with other non-body motion related data includes environment input which includes at least one of the following:
    temperature, humidity, heat index, air quality, including particle matter (non-biological), biological matter and chemical pollutants, UV exposure, and/or sound exposure.

6. The system of claim 2 wherein the at least one input variable of the one or more input variables associated with body motion related data includes at least one of the following: bending (forward, backward, sideways) and twisting behavior (count, duration), walking (steps, duration), running (steps, duration), stillness, smoothness, repetitive motion, slips, trips, falls, squatting, jumping, heavy lifting and/or physical exertion.

7. The system of claim 6 wherein determining the metric includes using pattern recognition to identify motions from the body motion related data.

8. The system of claim 7 wherein the processor is further configured to use one or more machine learning algorithms to update the activity models over time.

9. The system of claim 7 wherein using pattern recognition includes using a Gausian or Hidden Markov model for modeling the one or more input variables to perform the pattern recognition to determine the body motion related data.

10. The system of claim 1 wherein communicating information pertaining to the metric indicating one or more actions for the worker to take to reduce risk of injury includes at least one action to reduce risk related to the non-body motion related data.

11. The system of claim 1 wherein the processor is further configured to communicate a risk assessment of the worker risk assessments of a team of multiple workers to a user device of a supervisor.

12. A non-transitory computer readable medium including instructions stored thereon for determining an activity safety metric the instructions configured to cause one or more processors to perform operations comprising:
    receiving input data of a plurality of activity condition variables, the input data including motion data received from a data collection device;
    identifying one or more motion segments within the motion data;
    associating the one or more motion segments with one or more motion types stored in memory, the association based at least in part on a comparison with motion type data stored in memory, the motion type data determined to correspond to one or more motion types;
    validating the motion type associated with each motion segment of the one or more motion segments based at least in part on a determination of whether the motion type is probable for the motion segment based at least in part on the motion types associated with the motion segments occurring before and/or after the motion segment; and
    determining a metric indicative of the safety of an activity associated with the input data based at least in part on the input data and the validated motion types associated with the one or more motion segments.

13. The non-transitory computer readable medium of claim 12, wherein the motion type data is based at least in part on previously recorded input data.

14. The non-transitory computer readable medium of claim 12, wherein the metric indicative of a safety of the activity is a metric indicative of the risk of injury.

15. The non-transitory computer readable medium of claim 12, further comprising generating one or more models representative of normal activity conditions based at least in part on the input data received over time.

16. The non-transitory computer readable medium of claim 15, further comprising comparing the input data with the one or more models representative of normal activity conditions to identify an abnormal activity condition.

17. The non-transitory computer readable medium of claim 12, wherein the motion data is derived from an output of one or more motion sensors of the data collection device.

18. The non-transitory computer readable medium of claim 12 further comprising communicating information pertaining to the metric to a user device.

19. The non-transitory computer readable medium of claim 12, wherein the information pertaining to the metric includes one or more of a risk score, a factor causing a change to the metric, information pertaining to how to improve the metric, and an award based on the metric.

* * * * *